United States Patent [19]

Barta et al.

[11] Patent Number: 4,634,455

[45] Date of Patent: Jan. 6, 1987

[54] PROCESS AND APPARATUS FOR DEHUMIDIFICATION OF GASEOUS MEDIA

[75] Inventors: Gyorgy Barta; Jozsef Aszlanyi, both of Budapest, Hungary

[73] Assignee: Innofinance Altalanos Innovacios Penzintezet, Hungary

[21] Appl. No.: 801,774

[22] Filed: Nov. 26, 1985

[51] Int. Cl.$^4$ ............................................. B01D 53/16
[52] U.S. Cl. ........................................... 55/32; 55/48; 55/49; 55/89; 55/222; 55/227
[58] Field of Search ................... 55/32, 48, 49, 89, 185, 55/208, 222, 227

[56] References Cited

U.S. PATENT DOCUMENTS

| | | | |
|---|---|---|---|
| 2,114,787 | 4/1938 | Smith | 55/32 X |
| 2,428,643 | 10/1947 | Young | 55/48 X |
| 2,806,552 | 9/1957 | Koble | 55/49 X |
| 2,935,154 | 5/1960 | Kelley | 55/32 X |
| 2,990,910 | 7/1961 | Kimmell | 55/32 |
| 3,074,216 | 1/1963 | Loebel | 55/185 |
| 3,375,639 | 4/1968 | Miller et al. | 55/48 X |
| 3,672,126 | 6/1972 | Goettle | 55/222 X |
| 4,084,944 | 4/1978 | Chirico | 55/185 X |
| 4,184,855 | 1/1980 | Butwell et al. | 55/48 |

Primary Examiner—Robert Spitzer
Attorney, Agent, or Firm—Cushman, Darby & Cushman

[57] ABSTRACT

For dehumidifying a gas it is intensively contacted in an absorber with an absorbing solution, the quantity of which is 10 to 100-fold the vapor absorbed, and a similar quantity is circulated in an expeller, a part of the solution circulating in the absorber is separated and supplied into the circulation of the expeller, and the solution from which the vapor content has been driven out is led back to the absorber.

10 Claims, 7 Drawing Figures

PROCESS AND APPARATUS FOR DEHUMIDIFICATION OF GASEOUS MEDIA

This invention relates to a process of dehumidification of gaseous media, particularly relating to drying wet gases and air in airconditioning equipments, by means of absorption performed by a vapor absorbing solution, further to an apparatus for carrying out the process.

Drying is a technological process in the course of which decrease of moisture content of solid and gaseous materials takes place during the change state of aggregtion of the mositure. It is essential that the material to be dried be not impaired in product quality and the drying operation is to be carried out at optimal cost and time expenditure. Condition thereof consists in extensive adjustment of the drying task to the character of the interconnection between moisture and material during the entire drying process. Further condition of the optimum lies in removal of the prescribed amount of moisture by a drying medium of the lowest possible temperature and the least possibly quantity. Numerous technical solutions have been realized to meet the above-mentioned requirements but in all cases various disadvantages hinder an optimal realization of the drying process in respect of quality of the dried product and of energy consumption as well.

In case of each known system (e.g. spray-drying, static- and fluid-bed drying, textile drying frames, different food processing driers, etc.) material quality and output, thus economy, are in inverse relation to each other. Increased temperature of drying medium has, especially in case of organic matter, a deleterious effect on the material quality, though increases output, but unutilized heat content of the drying medium discharged from the system is substantial even if applying heat utilizing systems. Drying of some materials (e.g. leather, pelts, wooden articles, furniture elements, ceramics, insulators, moulds and cores, pastries) by the known procedures leads often to damages (cracked surfaces, warping, shrinking and generally inferior quality) because of the special bonding form of humidity within these materials and because the ideal coordination of drying velocity and time, characteristic to the materials in question, is not or hardly possible.

These are some drying processes and equipments known where the drying capability of the gaseous drying medium is determined in these processes by the type, composition and temperature of the applied absorbing solution and shows frequently much lower values than the ambiant air. This brings along the attainable lower drying temperature and in consequence a better efficiency, as well as improved quality of the material.

One known solution (Hungarian Pat. No. 179 114) has the important disadvantage that absorption of humidity can be performed only unsatisfactorily on the cooling surface not properly wetted with the solution, therefore, removal of humidity from the drying medium is much less advantageous than possible.

Similarly, in the pool-type expeller of the absorbed humidity, where vapor extracted from the drying agent is transformed to useful steam, vapor is developed in the same pressure vessel from a solution of varying temperature and concentration, consequently steam develops on a lower pressure than possible, which fact diminishes the possibility of its reuse.

This apparatus has the further disadvantage that cooling of the absorber being an important influencing factor on dehumidification, does not adjust itself directly to the humidity content of the drying medium which is necessary in drying technology, as its temperature is substantially influenced by winter and summer meteorological conditions. Thus the apparatus shows an improved operation in winter compared to summer, which fact is disadvantageous in relation of a good many products to be dried (drying in summer yields).

An other known apparatus (Hungarian Patent Ser. No. 179 156) is even less capable to adjust absorption and thus dehumidification of the drying agent to the requirements, as in case of this apparatus the substantial quantity of heat released during absorption is removed by the drying medium itself.

This results in the fact that own humidity content of the drying medium can not be influenced. This does not only unfavorably affect the quality but in case of medium-pairs having a measurable solution heat, the drying medium is absolutely unable to absorp any moisture. The multi-flash concentrating applied to expel humidity from the solution, on the other hand, does not render it possible to recover at least a part of the energy invested, what is possible in the previous process.

For dehumidification of the drying medium circulated in a closed or open system, the "Munters" or "KATHABAR" systems are widely used. Operation of the first is based on solid, that of the latter on fluid sorbents to bind humidity of air. Both have the common, essential disadvantage that regeneration of the sorbent is not economical in consequence of heavy heat losses, as recycling of the heat expended is not solved.

All processes operating with sorbents have the common disadvantage that temperature of the drying agent which has already done its work, is limited to about 300° K. During removal of moisture from the gaseous drying medium, this medium has to be cooled in the course of absorption. At drying medium temperatures exceeding the above indicated values, cooling is accompanied by such extent of heat-removal that the whole process is rendered uneconomical.

The aim of this invention is the development of a procedure eliminating the above mentioned disadvantages, i.e. it makes possible to keep temperature and starting humidity content of the drying medium on appropriate values required by quality and energy saving during the drying process, as well as to maintain temperature and pressure of the steam produced from the absorbed humidity constantly on a value close to the temperature of the heating medium. Moreover, in the invention the temperature of the drying medium discharged from the drier is not limited, therefore, it can be applied to almost any drier in order to improve quality and energetics of the process.

The invention is based on the recognition that both absorber and expeller can be operated differently between various solution concentration limits, further, that the amount of the absorbing solution circulated in the absorber and the expeller can be adjusted individually by means of recirculation. In consequence of all these, both absorption and explusion can operate separately under thermal conditions determined by the drying procedure and external circumstances (temperature of cooling water, temperature of the available heating medium) in an economical way.

An intensive contact both in the absorber and in the expeller is needed, the former between the absorbing solution and the cooling surfaces, the latter between the absorbing solution and the heating surfaces. By constructions for similar aims used until now, the perfect contacting was assured by the application of baffle plates, distributors or bubble plates. By using these constructional elements the possibility—recognised by this invention—was not considered that by reduction or augmentation of the quantity of the absorbing solution—even by using the same mechanical construction—the contant can be controlled or adjusted. The application of the new method mentioned above means, that the absorber or the expeller constructed and manufactured in the same way and same size can be used for dehumidification purposes varying between wide limits.

We have finally recognized that by heat exchange effected between ingoing wet and the dried drying agent discharged from the absorber, harmful cooling of the drying agent does not take place in the absorber, thus losses resulting from re-heating are almost eliminated.

Similarly circulation of a lower solution flow-rate between the absorber and expeller compared to preset soluiton quantity, enables use of a smaller-size heat-exchanger, which is applied for diminution of heat losses that would be necessary for the total solution quantity circulating between absorber and expeller. Thus beside reduction of dimensions, inevitable heat-losses are also reduced.

Thus, a characteristic feature of the process according to the invention is that heat exchange is performed between the humid gaseous medium and the dehumidified gaseous medium. By controlling humidity content of the absorbing solution according to differences in water concentration between absorber and expeller or to temperature of absorber, an absorbing solution amounting to 10 to 100-fold of the absorbed quantity of humidity is circulated in absorber, partly by recirculation, partly by feeding into the expeller and therefrom after enrichment by back flow and mixing. Likewise in the expeller an absorbing solution amounting to 10 to 100-fold of the absorbed quantity of humidity is circulated and the vapor quantity corresponding to the absorbed quantity of humidity will be expelled by means of heating, then in order to replace solutio quantities discharged from the absorber, the remaining part of the solution will be fed back into the absorber. The solutio cycle of expeller will be developed according to variable flushing, either by simple flow or by increased circulation. Expeller with variable flushing is shaped with two solution levels.

An important characteristic feature of the apparatus according to invention is that it has an absorber provided with a cooler and an expeller provided with a heater. Absorbing solution circulates in the absorber and expeller by means of pumps. Solution is delivered from the absorber to this expeller by a feeding pump. A heat exchanger is connected to the feeding pump. Medium ingoing into and discharged from the apparatus passes through a heat exchanger.

One version of the expeller is a horizontal cylinder having heating tubes with internal heating. The cylinder having a steam dome provided with bubble-capped plates at one end is connected by a piping to the other end of cylinder. On the steam dome there is a vapor outlet stub.

An other embodiment of the expeller is a vertical cylindric vessel having heating tubes with external heating and liquid distributing extensions on the upper pipe-ends. Solution collector is connected to the upper liquid-level by an overflow-pipe.

The expeller is provided with a level-sensing-device, in the heating cycle of the expeller there is a magnetic valve and a further magnetic valve controlling delivery of feeding pump. The level sensor is connected to the magnetic valves by pilot wires. To the absorber and expeller a water concentration-difference sensing device and pilot wires thereof are connected to the feeding pump.

The process according to the invention is described by operation of examples of the apparatus according to the invention. On the attached drawings following are illustrated:

Figure 1:
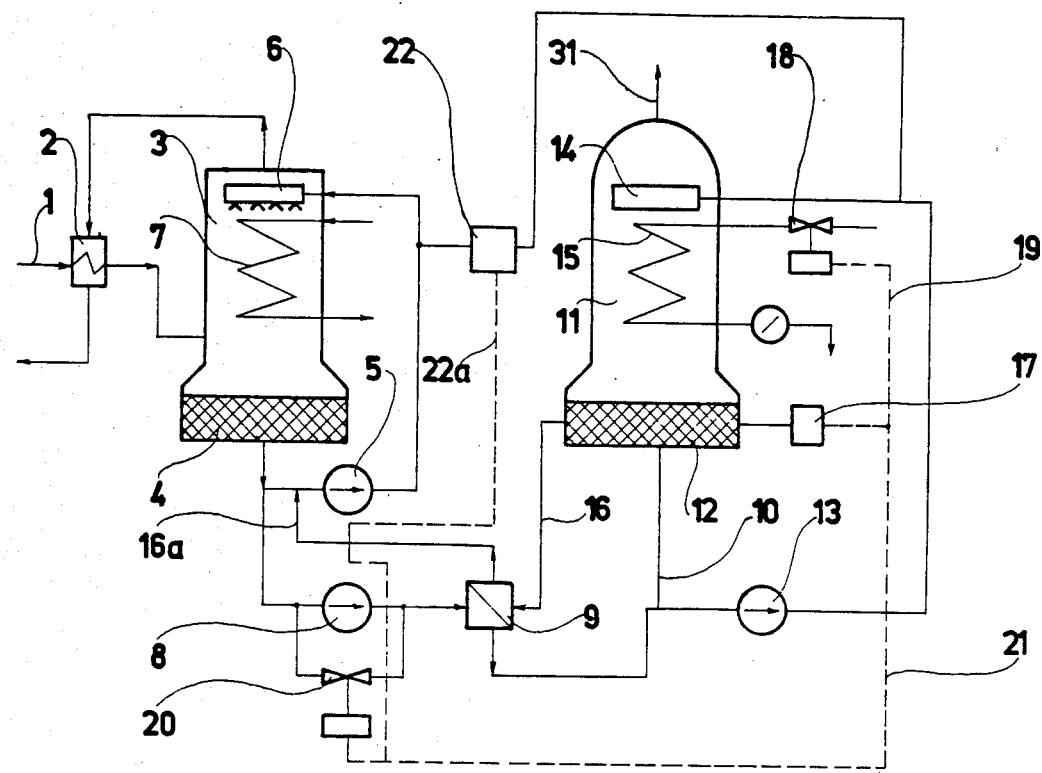
FIG. 1 shows the circuit diagram of the whole apparatus.

The medium to be dried, e.g. humid gas, ambiant air, etc. passes through line 1 and gas-gas heat exchanger 2 to absorber 3 by means of a delivery fan not illustrated. A hygroscopic absorbing solution as aqueous solution of calcium lithium, magnesium chloride and lithium bromide or a mixture thereof circulates in absorber 3. A. part of the absorbing solution having taken the moisture is sucked from solution collector area 4 of the absorber 3 by pump 5 and is returned through liquid distributor 6 to absorber 3. The absorbing solution is spread uniformly by means of a liquid distributor 6 on surface of a cooling pipe-system 7 permeated with coolant of temperature $T_E$.

Mositure content of the gas will be removed close to the $T_E$ temperature by the absorbing solution. Between solution ingoing through the liquid distributor 6 and discharged from liquid collector 4, there is an enrichment $X_E$ in water concentration, having a rate of about 0.2 to 0.5 percent, i.e. absorptive solution circulated in absorber 3 is advantageously 20 to 50-fold of the absorbed moisture, but can reach the limits 10 to 100.

From the liquid collector 4 of absorber 3 with atmospheric $/P_o/$ pressure, a part of the solution is pumped by feeding pump 8 through a heat exchanger 9 to a pump 13 of expeller 11 having an overpressure $/P_1/$.

A part of the absorptive solution is pumped by pump 13 from liquid collector 12 of expeller 11 into a liquid distributor 14 situated in the upper part of expeller 11 and the absorptive solution is then uniformly distributed and spread on the surface of a heating tube system 15 with $T_K$ temperature.

As a result of heating there is a $X_K$ decrease in concentration of the absorbing solution ingoing through liquid distributor 14 and that of the collected in liquid collector 12. Circulating intensity of the absorbing solution amounts mostly to 20 to 50-fold of the volume of steam expelled, but may reach 10 to 100-fold of same as well.

The other part of the absorbing solution having a low water concentration, collected in liquid collector 12 passes through heat exchanger 9 and piping 16 and 16a to the suction side of pump 5. Concentration of the solution entering the absorber 3 has to be constant after blending and corresponds to the adjusting.

Operation of the expeller 11 is controlled by a level sensor 17. If level of expeller 11 drops too low in concequence of excessive heating by the heating tube system 15, the level sensor 17 actuates a magnetic valve 18 of heat control through a signal wire 19 by a choking or stopping signal. If on the contrary the level of expeller 11 raises too high by the effect of increase in solution-water-content in the absorber 3, level sensor 17 increases at first heating of the expeller 11 by opening the magnetic valve 18, then in case of further raise of solution level, actuates a magnetic valve 20 in the by-pass of pump 8, through signal wire 21 by an opening signal and thus the quantity of the delivered solution decreases more quickly.

In case of decrease of the difference between water concentrations $X_E$ of absorber 3 and $X_K$ of expeller 11 sensor 22 gives a controlling signal to increase the output of pump 8, otherwise it will decrease.

Figure 2:
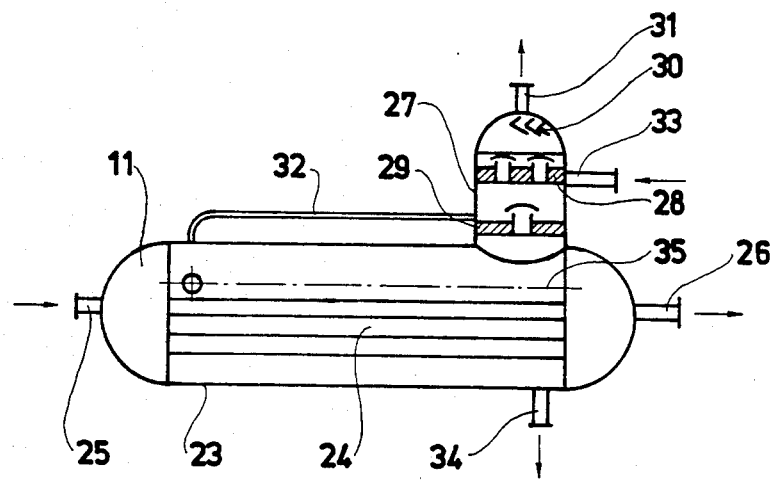
FIG. 2 is the side-view partly in section of permanently flushed expeller.

In case of a large equipment producing steam exceeding about 1000 kg per hour, because of the great amount of solution, application of pump 13 will be unnecessary and preferably a permanently flushed expeller is applied, shown in FIG. 2.

With the horizontal cylinder 23 of the permanently flushed expeller 11 there are heating tubes 24, in the interior of which a heating medium ingoing through pipe stub 25 and discharged through stub 26 is circulated. At one end of cylinder 23 there is a steam dome 27 provided with bubble capped plates 28 and an unbored plate 29 as well with spray catcher 30. Moisture expeller from the solution is discharged from steam dome 27 through vapor outlet stub 31.

Steam dome 27 is connected by a pipe 32 to the other end of cylinder 23. the absorbent solution ingo es into steam dome 27 via inlet stub 33 and is discharged from cylinder 23 through outlet stub 34. Solution level 35 in the cylinder 23 is practically constant, it varies only as a function of the rate of vapor developing.

Solution trickling down in counterflow with the vapor on bubble capped plates 28 and collecting on unbored plate 29 flows through line 32 to the other end of cylinder 23.

Solution with high water concentration flows along the outward mantle of heating tubes 24 from pipe 32 towards outlet stub 34; its path of flow is only slightly distored by the downward motion due to gravitation of solution particles, having an increased specific weight because of the vapor discharged on solution level 35. Droplets of vapor having an identical path of flow with the solution, are sedimenting during the long flow, the remaining droplets separate after having been scrubbed on bubble capped plates 28 and on plate 29 and by the effect of spray catcher 30.

Figures 3, 4:
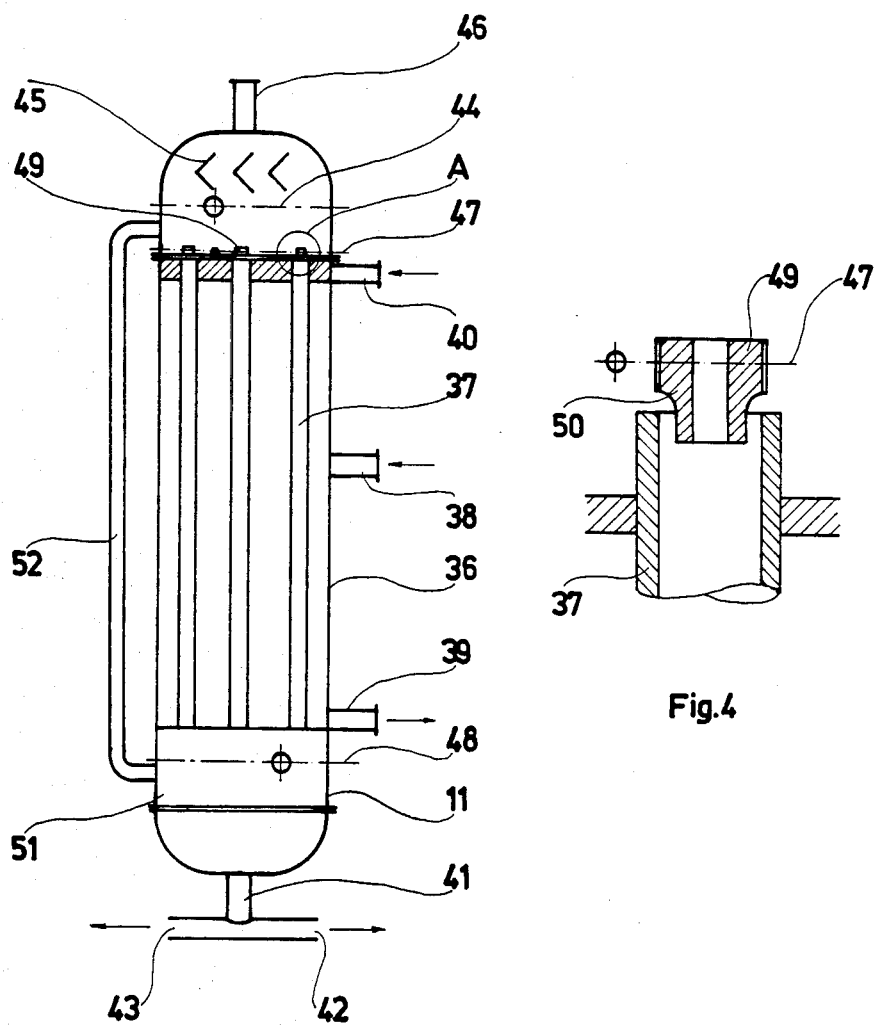
FIG. 3 is a side-view of a variably and permanently flushed expeller partly in vertical section.
FIG. 4 shows detail "A" of FIG. 3 and in FIG. 5a to 5c function diagrams of logP - 1/T of the thermal processes are illustrated.

In case of an equipment producing a minor quantity of steam, application of a variably flushed expeller 11 is suitable, as shown in FIG. 3. This columnar expeller 11 can equally be applied either as a permanently or as a variably flushed one. In its vertical cylinder 36 heating tubes 37 are placed, external surfaces thereof are contacting the heating medium inducted into cylinder 36 through inlet stub 38 and discharged through outlet stub 39. Absorbing solution is flowing through inlet stub 40, educted through pipe 41, and on branch pipe 42 to pump 13 on pipe string 43 to heat exchanger 9.

In case of permanent flushing, vapor is developing on solution level 44 and is discharged beside spray catcher 45 through outlet stub 46.

In case of variable flushing two solution levels 47 and 48 develop. On the upper end of heating tubes 37 there is an extension 49 having on collar 50 concentric milled slots. The solution trickles down on the internal surface of heating tubes 37 and vapor discharges from the solution over this large surface, thus accomplishing conditions of expulsion of constant temperature.

The solution with decreasing water concentration trickles down in the interior of heating tubes 37, filling up solution collector 51 to solution level 48. The height of solution level 47 is ensured by overflow pipe 52, but by means of level sensor 17 any desired solution level can be set.

Drying processes will be described in connection with logP - 1/T function diagrams; first the traditional drying process represented in FIG. 5a, then by FIGS. 5b and 5c the process according to the invention.

Figure 5C:
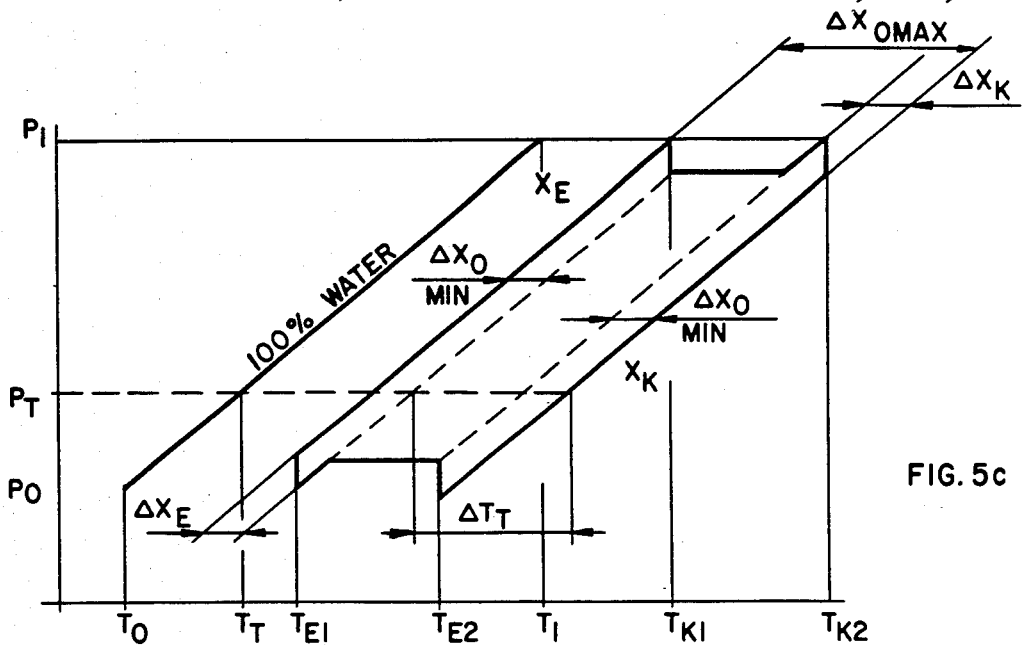
Figure 5B:
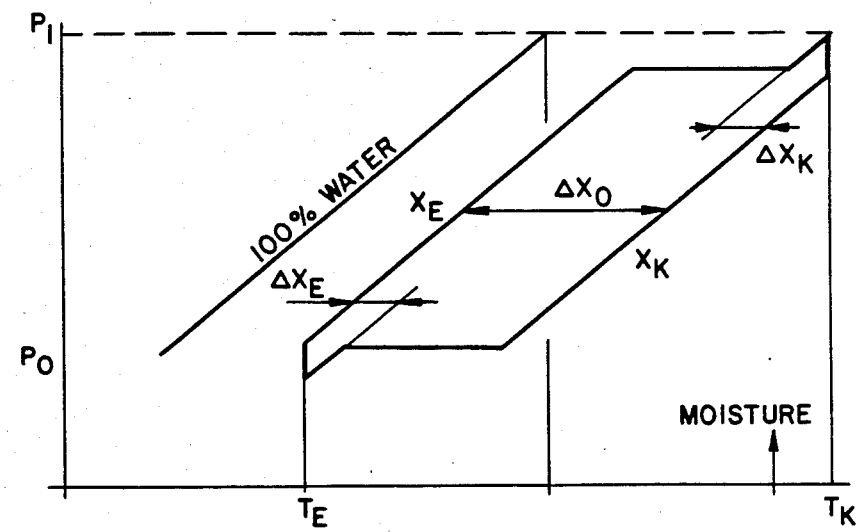
Figure 5A:
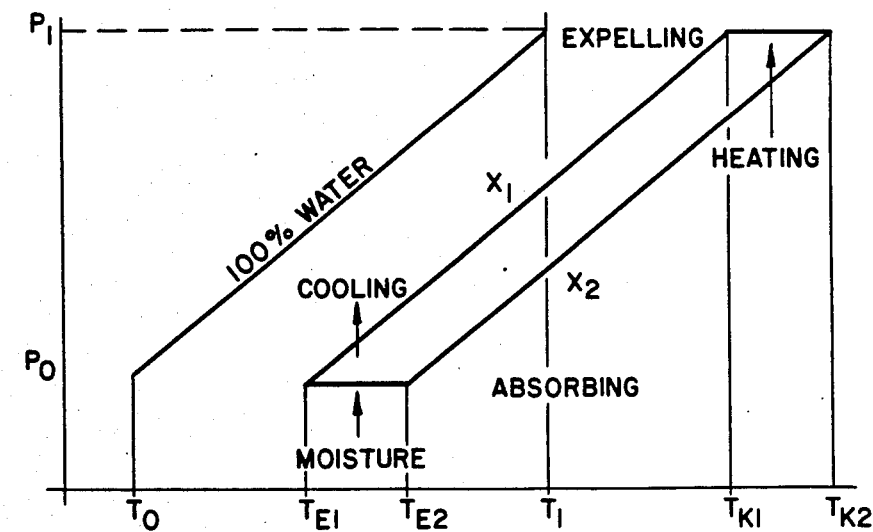

In case of a traditional drying process shown in FIG. 5a the temperature of the absorbing solution with low water content and $X_2$ concentration decreases in the absorber 3 from $T_{E2}$ to $T_{E1}$ temperature, while its water content increases to $X_1$ at an approximately constant $P_o$ pressure, corresponding to the partial pressure of the vapor contained in the drying medium according to Dalton's law.

In order to absorb vapor into the solution not only the heat corresponding to cooling, but also condensation and solution heat of the vapor has to be dissipated. With $P_o$ partial steam pressure of drying medium $T_o$ dew-point temperature is associated.

Absorbing solution, having $X_1$ concentration is in case of traditional drying procedure recirculated to the expeller in its whole quantity, where it has to be heated to $T_{K1}$, to the starting temperture of expulsion. Then by continued heating up to $T_{K2}$ temperature at $P_1$ *l pressure, saturated steam is withdrawn at* $T_1$ temperture, while concentration decreases to $X_2$ value.

Absorbing solution gets back to the absorber in this state, cooled to $T_{E2}$ temperature. Absorbing continues by further cooling and the cycle goes on again.

Outgoing moisture of $P_1$ pressure is of identical quantity as moisture absorbed at $P_0$ pressure. Heat content of moisture at $P_1$ pressure and $T_1$ temperature gets lost or can probably be recovered. Temperatures $T_{E1}$ and $T_{E2}$ are determined by in- and outgoing temperatures of cooling water, according to atmospheric conditions.

The total quantity of the solution leaving the absorbr gets into the expeller, while it warms up from $T_{E1}$ to $T_{K1}$ temperature, partly by means of heat exchange with the solution discharging from the expeller (of temperture $T_{K2}$), partly by the heating effect of an external heat source. Vapor collected in absorber will be expulsed by heat transmission within the expeller, while temperature of the solution rises from $T_{K1}$ to $T_{K2}$.

In this process of warming and back-cooling between expeller and absorber, the total flow of solution takes part, which results in increase of the dimension of the heat exchanger and in the amount of heat not to be recoverd by heat exchange; this amount of heat has to be removed from the process later in the absorber, by cooling.

From function diagram of the process according to the invention shown in FIG. 5b it can been seen that it contains three concentration differences, instead of one: i.e. differences in concentration between that of $\Delta X_E$ of absorbing solution within absorber 3, $\Delta X_K$ of solution within expeller 11 and finally that $\Delta X_O$ solution concentrations discharging from absorber 3 and expeller 11.

Absorption takes place at $T_E$ temperature, accordingly cooler 7 of the absorber 3 requires a cooling medium having a temperature lower than $T_E$ temperature. In the gaseous drying medium leaving absorber 3 vapor has $P_o$ partial presssure and $T_o$ dew point temperature. Condition of absorption at a temperature that could be considered constant is that $\Delta X_E$ concentration difference be at least 0.002 to 0.005 (0.2 to 0.5 per cent), which requires a suitable rate of solution circulation amounting to 20 to 50-fold of vapor absorbed in absorber 3, by recirculating pump 5.

In expeller 11 solution of $T_K$ temperature circulates, wherefrom on the surface of the heating tube system 15 installed into the equipment, steam of $T_1$ temperature of $P_1$ pressure is produced, which can be utilized either in the drying process or elsewhere. Quantity of steam produced totally corresponds to vapor quantity absorbed in absorber 3 from the drying medium by the absorbing solution. $X_K$ concentration difference being at least 0.002 to 0.005 (0.2 to 0.5 per cent) resulting in a vapor temperature to be considered constant during expulsion and requiring a quantity of solution fed into the expeller by recirculating pump 13 amounting to 20 to 50-fold of the evaporated moisture.

The rate of solution circulation between absorber 3 and expeller 11 is set by feeding pump 8, delivering solution of concentration $X_E$ into the expeller, wherefrom solution gets back after concentration change of rate $\Delta X_o$ into absorber with concentration $X_K$. By way of mixing with the solution delivered by recirculating pump 5 of absorber 3 the desired and required ingoing concentration of the solution develops. Consequently, concentration of the solution entering the absorber 3 and maintaining a constant temperature within absorber, can be adjusted by the amount of solution delivered by feeding pump 8 and be set according to the task of dehumidification and to the ambiant meteorological conditions.

Features of the process having a connection with the changing of the ambient circumstances, such as cooling and heating temperatures, mositure content of the gaseous drying medium, are depicted in a function diagram shown in FIG. 5c. It is to be seen that heating temperatures can vary between $T_{K2}$ and $T_{K1}$ and cooling temperatures between $T_{E2}$ and $T_{E1}$ in a relatively wide range, whereas parameters $T_0P_0$ drying medium and $T_1P_1$ of steam produced remain meanwhile constant. Consequently, the standard parameters of drying are to a great extent independent of the ambient temperature.

This effect of the process according to invention is achieved by the fact that while concentration differences $\Delta X_E$ and $\Delta X_K$ are always constant by the constant delivery output of pumps 5 and 13, the $\Delta X_o$ difference of the concentrations $X_E$ and $X_K$ can vary between the maximum and the minimum in function of solution delivery of pump 8, where the minimal and maximal values depend on cooling and heating temperatures. If cooling is minimal at temperature $T_{E1}$ and heating maximal at temperature $T_{K1}$ then the difference in concentration is maximal: $\Delta X_{OMAX}$, as depicted in function diagram 5c. Delivery of pump 8 is in this case minimal.

If temperature $T_{E1}$ rises e.g. in hot summer weather to $T_{E2}$ and $T_{K2}$ is invariably maximal, then concentration of absorber 3 is increasing to $X_K - \Delta X_{OMIN}$ without changing parameters $T_0P_0$, this needs the maximal delivery of feeding pump 8. If cooling temperature drops in winter to $T_{K1}$, the amount of solution circulated by increase of delivery of feeding pump 8, concentration of expeller 11 will decrease to $X_E + \Delta X_{OMIN}$ in comparison to $X_K$ value, similarly without a change in parameters $T_0P_0$.

In function diagram (according to FIG. 5c) the case can be observed when moisture content of the drying medium is kept on $T_TP_T$ saturation parameters. In this case cooling temperature has to be kept in temperature range $\Delta T_T$ between $X_E$ and $X_K$ extreme concentration values, with corresponding concentrations in the absorber and expeller set by delivery of pump 8.

EXAMPLE NO. 1

When drying different leather types in chamber- or trough-type driers, correct technology requires different drying medium parameters. Thus e.g.

| Type of leather | Buffed leather Velvet split | Chrome-side leather | Box calf | Glazed kid | Nappa leather (pelt) | Fell |
|---|---|---|---|---|---|---|
| Temperature °C. | 40 | 50 | 40 | 40 | 25–30 | 25 |
| Relative humidity, % | 55 | 40 | 50 | 55 | 60 | 70 |

By application of the process according to the invention, an aqueous LiCl-solution is to be used as absorbing solution and drying is performed by maintaining a solution concentration of 74–86 percent in absorber 3. Concentration $X_E$ is controlled according to FIG. 5b, by appropriate setting of delivery of feeding pump 8. The equipment offers preset parameters, almost independently from external temperature conditions. Temperature of cooling water of cooler 7 takes up temperatures between 10° and 40° C., while heating medium can have temperatures between 100° and 130° C.

EXAMPLE NO. 2

A textiles-drier, the so called tentering frame, dries an upwound e.g. cotton cloth sopped with aqueous colour by pulling it through a chamber heated with steam, perpendicularly to a hot air stream. In the chamber the cloth will be dried and after having been dried wound up again. Steam radiators warm up the air sucked from outside, this warm air will be circulated in the lower and upper level of the cloth, then the damp cool air will be emitted by means of stacks.

By application of the process according to invention, the discharged wet drying medium will be conveyed, probably through heat exchanger 2, to absorber 3, where moisture content is removed by an absorbing solution and the dried medium will be conveyed through the other space of the mentioned heat exchanger 2, to the air suction slot of drier. The steam produced in expeller 11 preheats air before entering the drier.

On basis of the process according to invention, an aggregate can be established and advantageously connected to drier. Specific heat consumption of the former lies in the range of 6700 KJ/kg water. In case of a concrete drier type 380 kg per hour water is removed by 1260 kg per hour of saturated steam of 5 bar pressure, this steam heating interior radiators of the drier.

By the procedure described above, interior radiators consume only 500 kg steam per hour but heating of expeller 11 requires 500 kg per hour of steam as well. On the other hand 380 kg per hour steam of 2.7 bar pressure develops to be used for subsequent heating circulation drying air.

After all, the task of drying can be implemented with an amount of 620 kg per hour steam, instead of the former amount of 1260 kg per hour. A further advantage of the invention is in this case that thermal loading of the environment is avoided, vapor content within the air of the workshop diminishes.

EXAMPLE NO. 3

To generalize the former example, the invention can advantageously be connected to any new or existing drier and thus the drying equipment can be rendered a closed process, where the humid medium withdrawn from the drier does not contain gases, vapors or solid contaminants reactive to the absorbing solution and thus energy is saved as described in Example 2. Simultaneously, if the above mentioned exclusion factors are not present, the formerly existing pollution of the environment is also coming to an end. If the humid drying medium withdrawn from the drier delivers e.g. chemically neutral dust or powder, absorber may operate as a scrubber for elution of the dust. The dust can be removed from the solution by a simple fluid filtration therefore the usually expensive cyclones for removing the dust can be omitted.

Advantages of the method according to the invention can be summarized as follows: moisture content of the drying medium is adjustable according to the character of connection between moisture and the material to be dried, and recovered steam having constant parameters $T_1$ $P_1$ can be utilized advantageously. The method is, besides, greatly insensitive to changes in climatic circumstances.

New or existing driers provided with dehumidifying equipment manufactured according to the invention operate in an energy saving manner and protect the environment. Method of circulation of solution promotes repeated wide range use of the apparatus.

We claim:

1. A process for dehumidifying a gaseous medium by means of absorption with a humidity absorbing solution, comprising the steps of:
    leading the said solution into an absorber, causing it to pass along a cooler situate within the absorber, letting it stream out and to recirculate,
    leading the gaseous medium into the absorber and intensively contacting it within the absorber with the absorbing solution, the temperature and water concentration of the latter being adjusted to practically constant values corresponding to the desired rate of dehumidification, the quantity of this absorbing solution being 10 to 100-fold the vapor absorbed,
    discharging the dehumidified gaseous medium from the absorber,
    circulating in an expeller a quantity of the solution 10 to 100-fold the vapor absorbed at a temperature higher than the temperature in the absorber,
    heating this solution by means of a heater in the expeller to drive out its previously absorbed humidity content, which is drained in the form of vapor at an outlet of the expeller,
    discharging a part of the solution circulating in the absorber at a branch outside this absorber and supplying this part of the solution into the circulation in the expeller, and
    discharging the solution from the expeller after driving out its said humidity content and leading it back into the solution circuit of the absorber.

2. The process according to claim 1 in which the gaseous medium is caused to stream into the absorber through a heat exchanger where it is cooled by means of the gaseous medium coming from the absorber.

3. The process according to claim 1 in which the absorbing solution taken form the circulation of the absorber is led, before it enters the expeller, through a heat exchanger where it is heated by the solution coming from the expeller.

4. The process according the claim 1 in which the vapor dirven out from the solution in the expeller leaves the expeller at a pressure greater than the pressure in the absorber.

5. The process according to claim 1 in which the quantity of the absorbing solution circulating in the absorber and in the same way the quantity circulating in the expeller is 20 to 50-fold the vapor absorbed, for an intensive contacting of the gaseous medium with the solution and a good heat transmission on the surface of the cooler and heater in the inside of the absorber and the expeller respectively.

6. Apparatus for dehumidifying a gaseous medium by means of absorption with a humidity absorbing solution, including:
    an absorber equipped with a cooler, an absorber solution circulation path including a pump for circulating the solution in this absorber, a heat exchanger for the gaseous medium inflowing into and discharged from the absorber,
    an expeller equipped with heater means for heating the solution therein, an expeller circulation path including a pump for circulating the solution in the expeller, and
    a feeding pump connected to the circulation path of the absorber and to a heat exchanger in which the solution coming from the absorber is heated by the solution coming from the expeller.

7. Apparatus as claimed in claim 6, in which the expeller contains a horizontal cylinder, having internally heated heating tubes; a stem dome near one end of said expeller, at least one plate with bubble caps and an unbored plate in the steam dome, a pipe connecting the other end of said cylinder to the steam dome for the solution collected on the unbored plate, and an outlet pipe on the steamdome for the vapor expelled from the solution.

8. Apparatus as claimed in claim 6, in which the expeller is comprised of a vertical cylinder, having externally heated heating tubes, having extensions on their upper ends, a solution collector on the lower part of the said cylinder, and an overflow pipe connecting the collector to the upper liquid level.

9. Apparatus as claimed in claim 6 in which the expeller is provided with a level sensor, said heating means including a magnetic valve, said absorbing solution circulation path including a magnetic valve for controlling the delivery of said feeding pump, said level sensor being operatively connected to said magnetic valves in the absorbing solution circulation path and in said heating means.

10. Apparatus as claimed in claim 6, further including a sensor arranged between the absorber and the expeller for sensing the concentration difference between the solution in the absorber and in the expeller, respectively, and for regulating the feeding pump in response to the sensed concentration difference.

* * * * *